(12) United States Patent
Wilks et al.

(10) Patent No.: US 11,764,002 B1
(45) Date of Patent: Sep. 19, 2023

(54) ULTRACAPACITOR GENERATOR START MODULE

(71) Applicant: Richardson Electronics, Ltd., LaFox, IL (US)

(72) Inventors: Jeremy Winston Wilks, LaFox, IL (US); John Raymond Curran, LaFox, IL (US); Brian Christopher Gumino, LaFox, IL (US); Stephen Edward Fischer, LaFox, IL (US); Mason Patrick Kelley, LaFox, IL (US); Peter Mark Bocek, LaFox, IL (US); Justin Marshall Block, LaFox, IL (US)

(73) Assignee: Richardson Electronics, Ltd., Lafox, IL (US)

( * ) Notice: Subject to any disclaimer, the term of this patent is extended or adjusted under 35 U.S.C. 154(b) by 0 days.

(21) Appl. No.: 17/861,725

(22) Filed: Jul. 11, 2022

(51) Int. Cl.
  *H01G 11/08* (2013.01)
  *H01G 11/78* (2013.01)
  *H02J 7/34* (2006.01)
  *H01C 7/02* (2006.01)

(52) U.S. Cl.
  CPC ............... *H01G 11/08* (2013.01); *H01C 7/02* (2013.01); *H01G 11/78* (2013.01); *H02J 7/345* (2013.01)

(58) Field of Classification Search
  CPC ..................................................... H01G 11/08
  USPC ........................................................ 320/167
  See application file for complete search history.

(56) References Cited

U.S. PATENT DOCUMENTS

| | | | |
|---|---|---|---|
| 2013/0266826 A1* | 10/2013 | Cowperthwaite | H01M 16/00 29/25.42 |
| 2016/0053737 A1* | 2/2016 | Solberg | F02N 11/0866 701/113 |
| 2016/0176298 A1* | 6/2016 | Watson | B60L 58/20 307/10.6 |
| 2016/0298589 A1* | 10/2016 | Setterberg | H02J 7/1423 |

OTHER PUBLICATIONS

SkelStart Engine Start Module; Skele+on Technologies; https://www.skeletontech.com/skelstart-ultracapacitor-engine-start-module; retrieved on Jul. 11, 2022; pp. 1-11.

* cited by examiner

*Primary Examiner* — Jerry D Robbins
(74) *Attorney, Agent, or Firm* — Erise IP, P.A.

(57) ABSTRACT

An energy storage system and energy storage module for providing electrical energy to a generator start energy system or other electrically driven system. One or more ultracapacitors are included within the energy storage module for storing and providing electrical charge via a two-post electrical connection of the energy storage module. A mountable housing of the energy storage module provides a variety of mounting orientations within a compartment of the generator start energy system or other electrically driven system.

20 Claims, 11 Drawing Sheets

ULTRACAPACITOR GENERATOR START MODULE

BACKGROUND

1. Field

Embodiments of the invention relate to energy storage modules. More specifically, embodiments of the invention relate to energy storage modules for replacing batteries within a generator start system.

2. Related Art

Ultracapacitors have been known as an alternative energy storage device. Ultracapacitors have quicker charging and discharging times, operability for a range of temperatures, and suitability for significantly more charging cycles when compared with batteries. However, existing ultracapacitor energy devices are also associated with a number of drawbacks. Typical ultracapacitor energy devices require extensive modifications to the battery housing for installation and retrofit of the battery with an ultracapacitor, such as adapters and additional wiring harnesses, which increases the cost of installation. For example, typical ultracapacitor energy devices cannot interface with the existing battery wiring harness. Additionally, operating parameters of an ultracapacitor as compared to a battery are frequently significantly different. For example, in some usage environments, charging of an ultracapacitor is carried out using a separate charging port used exclusively for charging as compared to a typical battery that is charged using the same positive and negative terminals that provide energy output. As such, additional wiring is needed to properly install and charge said traditional ultracapacitor energy devices. Further, existing ultracapacitor energy devices are not suited to handle the transient electrical spikes associated with the two-post electrical connection of most batteries.

SUMMARY

Embodiments of the invention solve the above-mentioned problems by providing a two-post energy storage module configured to be a drop-in replacement for a battery. The energy storage module comprises one or more ultracapacitors and a two-post electrical connection resembling that of a battery. In some embodiments, the energy storage module includes passive electronics that passively limit charging voltage and current based on temperature.

In some aspects, the techniques described herein relate to an energy storage module for replacing one or more batteries within a generator start energy system, the energy storage module including a mountable housing for installation within a compartment of the generator start energy system, one or more ultracapacitors disposed within the mountable housing, a two-post electrical connection disposed on the mountable housing, the two-post electrical connection including a positive terminal and a negative terminal electrically connected to the one or more ultracapacitors for charging and discharging the one or more ultracapacitors, an electrical circuit disposed within the mountable housing, the electrical circuit interfacing with the one or more ultracapacitors, and one or more Positive Temperature Coefficient (PTC) thermistors disposed within the electrical circuit for passively limiting a charge current of the one or more ultracapacitors based on an internal temperature of the energy storage module.

In some aspects, the techniques described herein relate to an energy storage module, further including an auxiliary charging port for charging the one or more ultracapacitors via one or more external power sources, the auxiliary charging port including a dry contact for isolating the auxiliary charging port from the two-post electrical connection.

In some aspects, the techniques described herein relate to an energy storage module, wherein the one or more external power sources includes a solar panel, and wherein an output of the solar panel is electrically connected to the auxiliary charging port for supplying electrical energy to charge the one or more ultracapacitors.

In some aspects, the techniques described herein relate to an energy storage module, wherein an input current of the auxiliary charging port is passively limited such that the input current is electrically shorted when the one or more ultracapacitors are fully charged.

In some aspects, the techniques described herein relate to an energy storage module, wherein the electrical circuit includes a plurality of current path channels for providing current path diversity within the electrical circuit, wherein a respective one of the one or more PTC thermistors is disposed within each current path channel of the plurality of current path channels.

In some aspects, the techniques described herein relate to an energy storage module, further including an auxiliary connector port configured to interface with a Bluetooth module, and a cutaway portion in the mountable housing providing space for the Bluetooth module.

In some aspects, the techniques described herein relate to an energy storage module, wherein a signal indicative of one or more parameters of the energy storage module is transmitted through the auxiliary connector port to the Bluetooth module for analysis of the one or more parameters of the energy storage module.

In some aspects, the techniques described herein relate to an energy storage system for providing energy for one or more electrical devices, the energy storage system including a plurality of energy storage modules disposed within a compartment associated with the one or more electrical devices, each energy storage module of the plurality of energy storage modules including a mountable housing for installation within the compartment associated with the one or more electrical devices, one or more ultracapacitors disposed within the mountable housing, a two-post electrical connection disposed on the mountable housing, the two-post electrical connection including a positive terminal and a negative terminal electrically connected to the one or more ultracapacitors for charging and discharging the one or more ultracapacitors, an electrical circuit disposed within the mountable housing, the electrical circuit interfacing with the one or more ultracapacitors, and one or more Positive Temperature Coefficient (PTC) thermistors disposed within the electrical circuit for passively limiting a charge current of the one or more ultracapacitors based on an internal temperature of the respective energy storage module.

In some aspects, the techniques described herein relate to an energy storage system, further including one or more batteries disposed within the compartment associated with the one or more electrical devices.

In some aspects, the techniques described herein relate to an energy storage system, wherein the plurality of energy storage modules and the one or more batteries are electrically connected in series.

In some aspects, the techniques described herein relate to an energy storage system, wherein the plurality of energy storage modules and the one or more batteries are electrically connected in parallel.

In some aspects, the techniques described herein relate to an energy storage system, further including a strap disposed around two or more energy storage modules of the plurality of energy storage modules for securing the two or more energy storage modules within the compartment associated with the one or more electrical devices.

In some aspects, the techniques described herein relate to an energy storage system, wherein the one or more PTC thermistors provide additional energy when the internal temperature of the respective energy storage module is below a predefined threshold temperature.

In some aspects, the techniques described herein relate to an energy storage system, wherein the one or more PTC thermistors provide reduced energy when the internal temperature of the respective energy storage module is above a predefined threshold temperature.

In some aspects, the techniques described herein relate to an energy storage module for replacing one or more batteries within a generator start energy system, the energy storage module including a mountable housing for installation within a compartment of the generator start energy system, the mountable housing including a cutaway portion providing space around the mountable housing of the energy storage module, one or more ultracapacitors disposed within the mountable housing, a two-post electrical connection disposed on the mountable housing, the two-post electrical connection including a positive terminal and a negative terminal electrically connected to the one or more ultracapacitors for charging and discharging the one or more ultracapacitors, an electrical circuit disposed within the mountable housing, the electrical circuit interfacing with the one or more ultracapacitors, and an auxiliary charging port disposed on the mountable housing within the cutaway portion for charging the one or more ultracapacitors via one or more external power sources, the auxiliary charging port including a dry contact for isolating the auxiliary charging port from the two-post electrical connection.

In some aspects, the techniques described herein relate to an energy storage module, further including one or more Positive Temperature Coefficient (PTC) thermistors disposed within the electrical circuit for passively limiting a charge current of the one or more ultracapacitors based on an internal temperature of the energy storage module.

In some aspects, the techniques described herein relate to an energy storage module, further including an auxiliary connector port disposed on the mountable housing within the cutaway portion for interfacing the energy storage module with one or more external devices.

In some aspects, the techniques described herein relate to an energy storage module, further including a Bluetooth module disposed within the cutaway portion and connected to the auxiliary connector port, the Bluetooth module operable to wirelessly communicate with the one or more external devices.

In some aspects, the techniques described herein relate to an energy storage module, wherein the Bluetooth module includes a processor for actively monitoring the one or more ultracapacitors.

In some aspects, the techniques described herein relate to an energy storage module, wherein the energy storage module is configured to be jumpstarted via the two-post electrical connection after installation within the compartment of the generator start energy system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
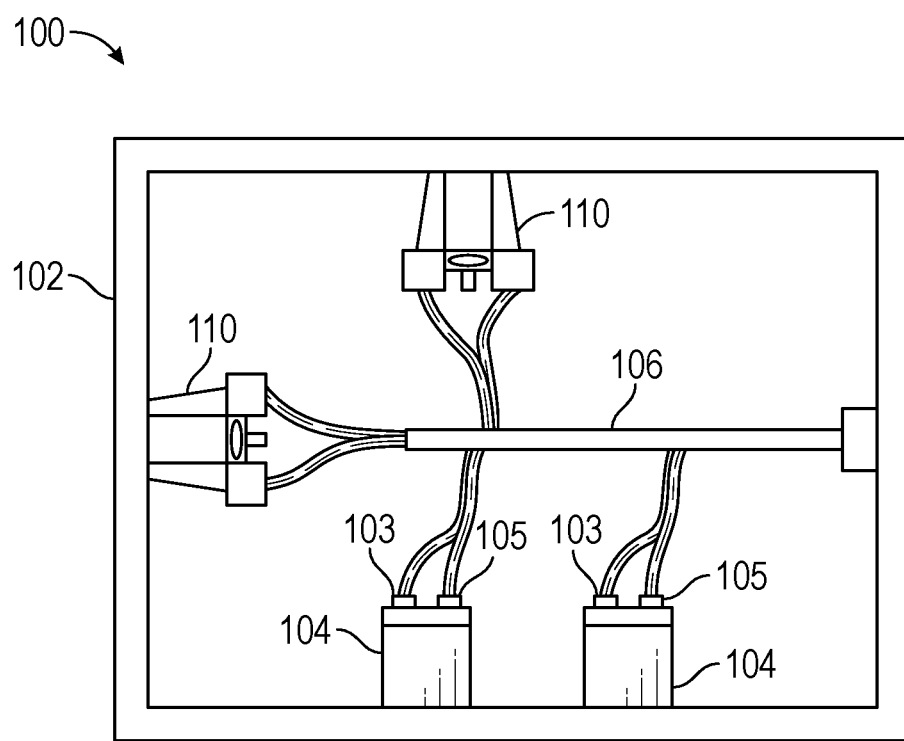
FIG. 1 depicts an exemplary generator start energy system relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Typical ultracapacitor modules contain a three-post electrical connection. A first post is a positive terminal, a second post is a negative terminal, and a third post is used for charging the ultracapacitor modules because the positive and negative terminals cannot safely be used for charging. Three-post ultracapacitors do not have one-to-one operating parameters compared to batteries. For example, three-post ultracapacitors known in the art require modifications to the existing battery electrical connections and pre-charging before installation. Some embodiments of the present disclosure contemplate using a capacitor-based energy storage module with only two posts. However, a capacitor-based energy storage module with two posts presents a range of additional challenges. For example, using the same electrical path for charging and discharging may cause the module to draw too much power, for example, due to a high electrical load or a transient charge current. Typical capacitor modules are configured to source all available current, which in some cases, leads to damage to the module or various other external devices in the electrical path. For example, in some cases, unlimited drawing of electrical current can damage an alternator electrically connected to the module. As such, prior art ultracapacitor modules typically require active electronic controls to actively monitor and control a separate charging circuit of the module. Such active control typically relies on expensive electrical components that are prone to error.

Accordingly, some embodiments of the present disclosure seek to provide a two-post ultracapacitor energy storage module designed to replace at least one battery without requiring additional installation modifications to the battery housing, battery harness, or other associated hardware or software. Additionally, the energy storage module may comprise passive electronics for passively limiting the electrical charging parameters based at least in part on temperature. Further still, embodiments are contemplated in which operation of the energy storage module is carried out passively without any internal controllers. As such, the energy storage module is able to operate without sacrificing valuable energy to active components such as a microcontroller.

In some embodiments, an energy storage module 110 is provided for replacing at least one battery or other storage device. In some embodiments, a two-post electrical connection of the energy storage module allows for the energy storage module to be a drop-in replacement for the at least one battery without requiring any modifications to the existing battery electrical connections. Further, in some embodiments, the energy storage module 110 comprises multiple electrical paths containing passive internal electronics that provide temperature-based current control to increase the efficiency of the energy storage module and to absorbing transient energy spikes. Further still, the multiple electrical paths provide charge path diversity to passively distribute the electrical current and to prevent transient energy spikes from damaging the energy storage module or other components electrically connected to the energy storage module.

Form Factor

FIG. 1 depicts an exemplary generator start energy system 100 relating to some embodiments. In some embodiments, the generator start energy system 100 comprises a battery compartment 102. In some such embodiments, one or more batteries 104 may be installed within the battery compartment 102, as shown. In some embodiments, the one or more batteries 104 may be electrically connected to the generator start energy system 100 via a battery wiring harness 106. Here, the battery wiring harness 106 may be connected to a positive terminal 103 and a negative terminal 105 of each respective battery 104.

In some embodiments, one or more energy storage modules 110 may be included in the generator start energy system 100. In some embodiments, the one or more energy storage modules 110 may be installed within the battery compartment 102. Alternatively, or additionally, in some embodiments, at least one of the energy storage modules 110 may be installed external to the battery compartment 102. In some embodiments, the one or more energy storage modules 110 may be mounted in various different orientations, as shown. For example, a first energy storage module may be positioned sideways relative to the standard battery mounting orientation, while a second energy storage module may be positioned upside down relative to the standard battery mounting orientation. Further, in some embodiments, the flexibility of mounting options of the energy storage modules 110 provides a range of mounting positions that would be inaccessible to a typical battery storage module. For example, in some embodiments, an energy storage module 110 may be mounted within a concealed location in which a typical battery would not fit to prevent theft.

In some embodiments, the one or more energy storage modules 110 may be mounted in any orientation, as opposed to the batteries 104, which are typically required to be mounted in a standard upright position, for example, to enable performance and to prevent leaking. Further, in some embodiments, the one or more energy storage modules 110 may be mounted within a separate hidden location, for example, to prevent theft. Here, the batteries 104 may still be placed within the battery compartment 102 even when not in use such that the batteries 104 act as a decoy to prevent theft of the one or more energy storage modules 110 installed elsewhere.

In some embodiments, each of the one or more energy storage modules 110 may interface with the battery wiring harness 106, as shown. Accordingly, in some embodiments, the energy storage modules 110 are configured to replace at least one battery 104 within the generator start energy system 100. In some embodiments, the same battery harness 106 may be disconnected from the terminals of one of the batteries 104 and connected to the terminals of the energy storage module 110. As such, embodiments are contemplated in which the energy storage module 110 is provided as a drop-in replacement for the batteries 104.

FIGS. 2A-2F depict various views of an exemplary energy storage module 110 relating to some embodiments. In some such embodiments, the energy storage module 110 is an ultracapacitor module storing electrical energy in one or more ultracapacitors, otherwise known as supercapacitors. In some of the embodiments described herein, the term "ultracapacitor" refers to an electrical capacitor with a much higher capacity than a standard capacitor. In some such embodiments, an ultracapacitor stores anywhere from 10 to 100 times more energy per unit of volume or mass compared to a standard capacitor. In some embodiments, ultracapacitors meet or exceed the storage requirements of batteries, transfer charge much quicker than batteries, tolerate more charge cycles than batteries, and are operable for a wider temperature range compared to batteries.

Figure 2A:
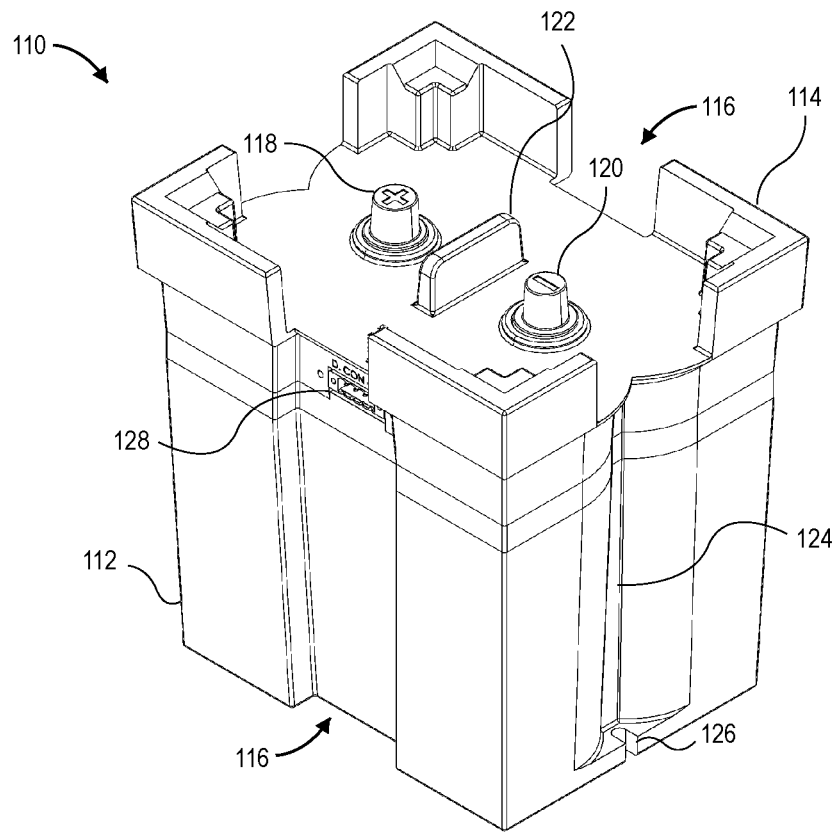
FIG. 2A depicts an isometric view of an exemplary energy storage module relating to some embodiments.

FIG. 2A depicts an isometric view of an exemplary energy storage module 110 relating to some embodiments. In some embodiments, the energy storage module 110 comprises a housing 112, as shown. In some embodiments, the energy storage module 110 further comprises a top section 114 disposed on a top surface of the housing 112. In some embodiments, the housing 112 comprises one or more walls with one or more cutaway portions 116, as shown. In some such embodiments, the one or more cutaway portions 116 provide multiple points of entry to a set of electronic connections of the energy storage module 110. Further, in some embodiments, the cutaway portions 116 extend down along the height of the housing 112, as shown. Further still, in some embodiments, one or more edges of the housing 112 may comprise a chamfer or fillet to remove sharp edges from the outer surface of the housing 112.

In some embodiments, the energy storage module 110 comprises one or more electrical terminals. For example, in some embodiments, the energy storage module 110 comprises two electrical terminals including a positive terminal 118 and a negative terminal 120. In some embodiments, each of the positive terminal 118 and the negative terminal 120 may be disposed on a top surface of the energy storage module 110, as shown. In some such embodiments, the one or more electrical terminals may be used, for example, to charge the energy storage module 110 and/or to provide electrical current to one or more external devices.

In some embodiments, each of the positive terminal 118 and the negative terminal 120 may be threaded for connecting to a respective electrical terminal connection of a power cable. For example, a connector portion of the power cable may be threaded similarly to receive the threaded electrical terminal. In some embodiments, a variety of selectable shapes and types of electrical terminals are contemplated. For example, in some such embodiments, an operator may select between straight terminals and tapered terminals based on the specific application and mounting position of the energy storage module 110. Further, an operator may select the connection type of the terminals between any of threaded, welded, quick-disconnect, ring, spade, and hook, as well as other suitable terminal connection types not explicitly described herein.

In some embodiments, the energy storage module 110 further comprises a barrier 122 disposed between the positive terminal 118 and the negative terminal 120, as shown. In some embodiments, the barrier 122 prevents electrical shock, for example, from objects from falling into the energy storage module 110 and contacting both the positive terminal 118 and the negative terminal 120. Accordingly, the barrier 122 may comprise a raised ridge extruding slightly past the height of the electrical terminals of the energy storage module 110, as shown.

In some embodiments, the housing 112 of the energy storage module 110 comprises a recessed portion 124 on one or more sides of the energy storage module 110. In some embodiments, the recessed portion 124 comprises one or more curved edges of the housing 112, as shown. In some such embodiments, the recessed portion 124 provides access to one or more mounting holes 126, as shown. In some embodiments, the mounting holes 126 may be adapted to receive a bolt or other suitable type of fastener for securing the housing 112 in place. Alternatively, or additionally, in some embodiments, other mounting means may be used to secure the energy storage module 110 within a mounting location. For example, in some embodiments, a strap may be used to hold the housing 112 in place. In some embodiments, said strap may be tightened onto the energy storage module 110 using a wingnut or other fastener. Further, in some embodiments, two or more energy storage modules 110 may be stacked upon one another and secured in place by placing a strap around the two or more energy storage modules 110.

In some embodiments, the energy storage module 110 further comprises an auxiliary charging port 128. In some embodiments, the auxiliary charging port 128 is disposed on a front side of the energy storage module 110. In some embodiments, the auxiliary charging port 128 provides an additional port for charging the energy storage module 110 from one or more external sources, as will be described in further detail below. In some embodiments, the cutaway portion 116 provides access to the auxiliary charging port 128, as shown. Accordingly, a cable may be plugged into the auxiliary charging port 128 and run along the spaced provided by the cutaway portion 116 such that the cable is not pinched or obstructed by the housing 112.

Figure 2B:
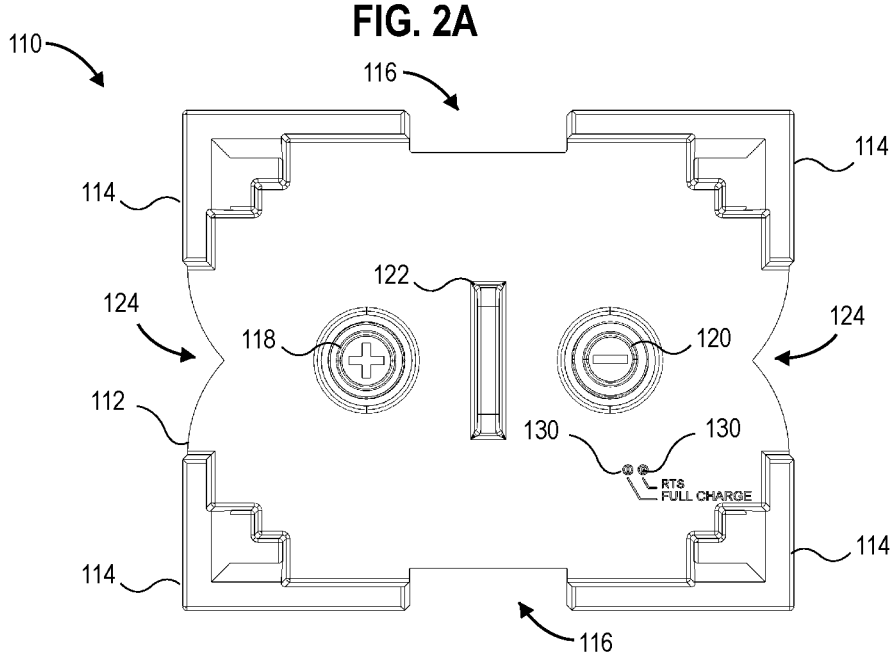
FIG. 2B depicts a top view of an exemplary energy storage module relating to some embodiments.

FIG. 2B depicts a top view of an exemplary energy storage module 110 relating to some embodiments. In some embodiments, the housing 112 of the energy storage module 110 comprises a substantially rectangular profile. For example, in some embodiments, the dimensions of a top surface of the energy storage module 110 may be selected such that the length is about 8 inches and the width is about 6.5 inches. In some embodiments, the overall height of the energy storage module 110 may be about 8.25 inches. It should be understood that the dimensions described herein are just a few examples and that many other varying dimensions of the energy storage module 110 are also contemplated. In some embodiments, the rectangular profile is selected to resemble the typical shape of a battery. However, in some embodiments, the energy storage module 110 may be much smaller than a battery of a comparable storage capacity. Accordingly, in some embodiments, additional mounting options are possible. Further, in some embodiments, one or more mounting adapters may be placed over the housing 112, for example, to mimic the specific size and shape of a battery being replaced by the energy storage module 110. In some embodiments, an adjustable mounting adapter may be used to adapt the energy storage module 110 to various different mounting locations.

In some embodiments, the energy storage module 110 comprises one or more indicators 130, which may be disposed on a top surface of the energy storage module 110, as shown. In some such embodiments, the indicators 130 may include, for example, one or more Light Emitting Diodes (LED) for notifying operators of one or more parameters of the energy storage module 110. In some embodiments, at least one of the indicators 130 may indicate a charge status of the energy storage module 110. For example, in some embodiments, the one or more indicators 130 comprise a ready to start indicator and a full charge indicator, as shown. The ready to start indicator may indicate whether the energy storage module 110 contains sufficient charge to perform a start operation to provide energy for starting an engine or a generator. The full charge indicator may indicate whether the energy storage module 110 is fully charged. It should be understood that, in some embodiments, the energy storage module 110 may provide energy to any of a number of electrical devices not explicitly described herein.

Figure 2C:
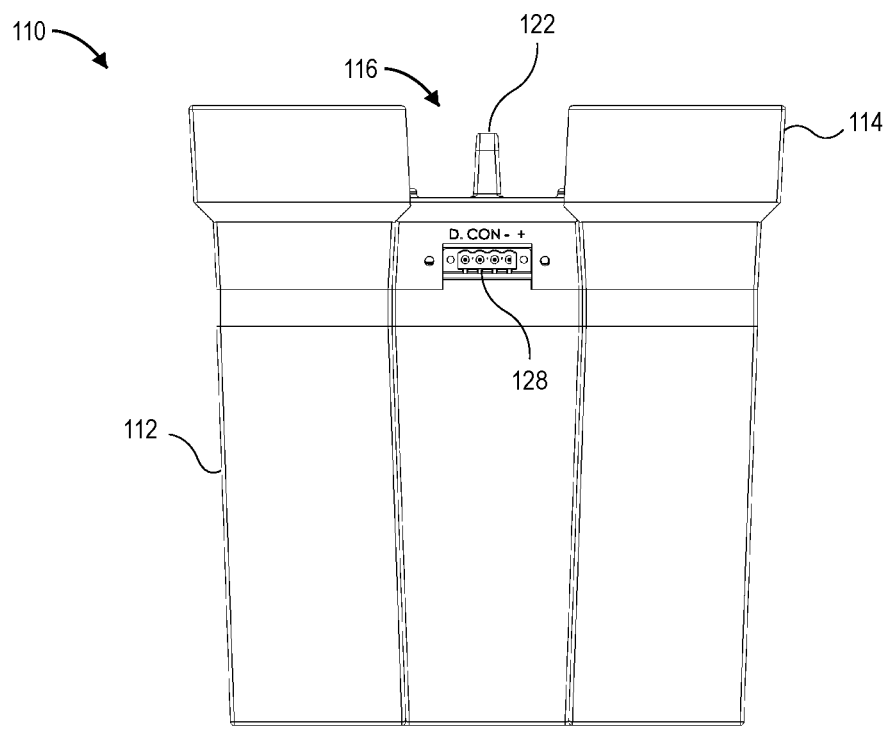
FIG. 2C depicts a front view of an exemplary energy storage module relating to some embodiments.

FIG. 2C depicts a front view of an exemplary energy storage module 110 relating to some embodiments. In some embodiments, the cutaway portion 116 extends along the height of the housing 112 to allow access for cables and other electrical connections from multiple points of entry. For example, a cable may run from above the energy storage module 110 across the top section 114 to the auxiliary charging port 128 or from beneath the energy storage module 110 on the front side (shown in FIG. 2C) up through the cutaway portion 116 to the auxiliary charging port 128.

In some embodiments, the housing 112 may be tapered along the height of the energy storage module 110, as shown. Here, the bottom of the housing 112 may have a length of about 7 inches compared to the length of the top portion of about 8 inches. In some embodiments, the tapered profile allows additional mounting options for the energy storage module 110. For example, the energy storage module 110 may be placed within an area having a smaller footprint. Additionally, in some embodiments, the tapered profile is adapted to interface with a mounting adapter, as described above. For example, an inner surface of the mounting adapter may be sized and tapered at a similar angle to receive the tapered housing. In some embodiments, the tapered profile of the housing 112 allows two or more energy storage modules 110 to be stacked vertically. For example, the bottom of one energy storage module 110 may be placed within the top of another energy storage module 110. In some embodiments, the bottom of the energy storage module 110 may be sized to fit between the wall portions of the top section 114 of the other energy storage module 110.

Embodiments are contemplated in which a protective cover may be disposed on top of the energy storage module 110. For example, in some embodiments, the wall portions of the top section 114 are adapted to receive a protective covering. In some embodiments, the protective covering may comprise a rigid transparent material such as a clear fiberglass or hard plastic sheet. In some such embodiments, the protective covering prevents damage from occurring to the electrical connections of the energy storage module 110 such as the positive terminal 118, and the negative terminal 120.

Figure 2D:
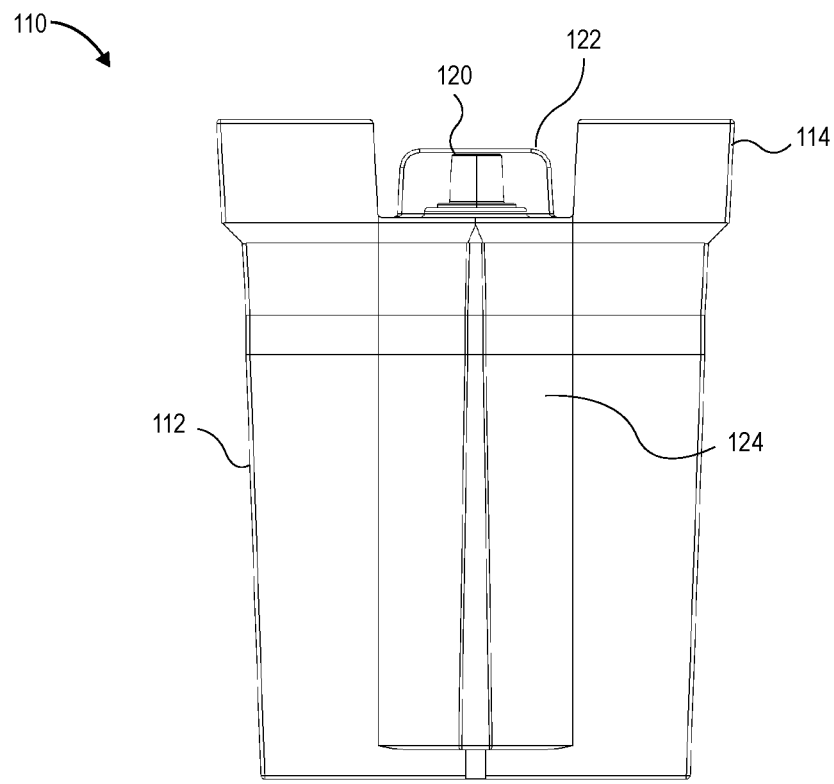
FIG. 2D depicts a side view of an exemplary energy storage module relating to some embodiments.

FIG. 2D depicts a side view of an exemplary energy storage module 110 relating to some embodiments. In some embodiments, a cable interfacing with one of the electrical terminals of the energy storage module 110 such as the negative terminal 120 may run through a gap between the wall portions of the top section 114. Similarly, another cable may run through a gap between the wall portions on the opposite side to interface with the positive terminal 118. Additionally, or alternatively, in some embodiments, the recessed portion 124 provides a space for a cable to run from beneath the energy storage module 110 or from the side of the energy storage module 110 up to the top section 114.

Figure 2E:
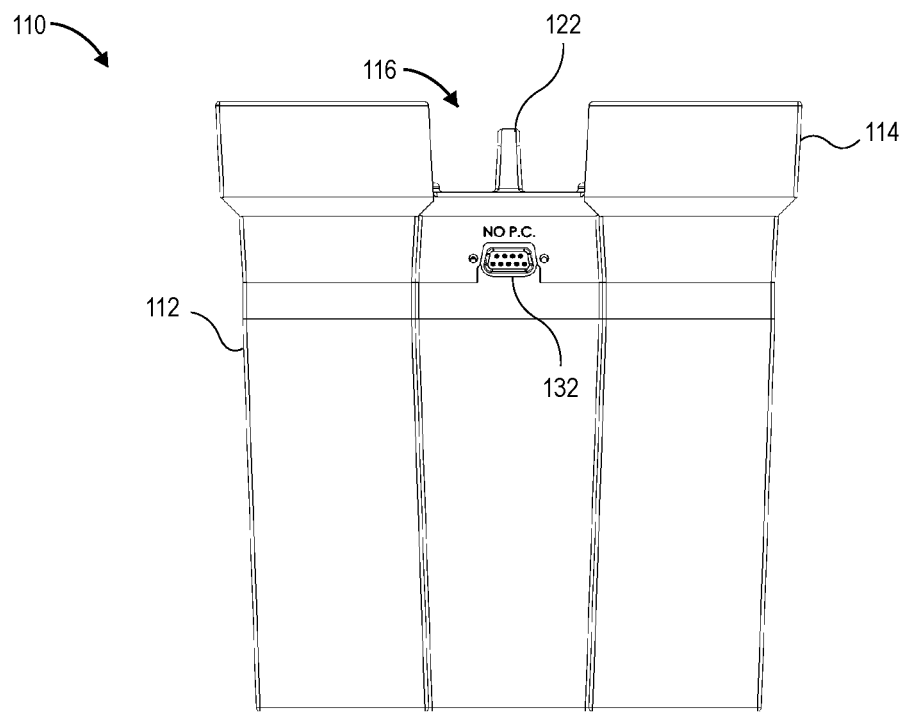
FIG. 2E depicts a rear view of the exemplary energy storage module relating to some embodiments.

FIG. 2E depicts a rear view of the exemplary energy storage module 110 relating to some embodiments. In some embodiments, the energy storage module 110 comprises an auxiliary connector port 132, which may be disposed on a rear side of the energy storage module 110, as shown. In some embodiments, the auxiliary connector port 132 provides a connection point for one or more auxiliary devices, such as a Bluetooth device, an external controller, or a mountable external device. For example, in some embodiments, the auxiliary connector port 132 may be adapted to receive either of a connection cable for interfacing with an external device or for receiving a mountable device that is sized to fit within the space provided by the cutaway portion 116. In some embodiments, the ultracapacitors described herein comprise double-layer capacitors, pseudocapacitors, hybrid capacitors, or a combination thereof.

Figure 2F:
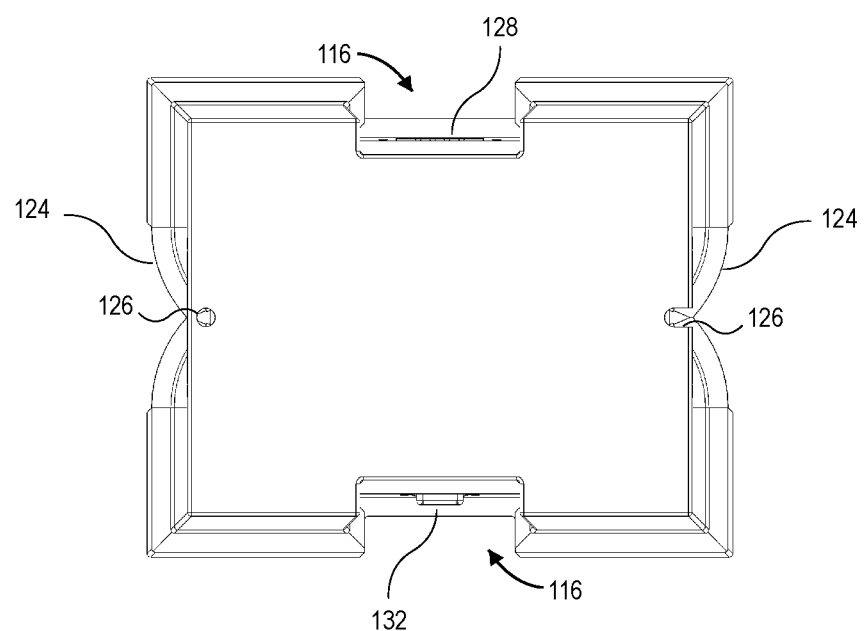
FIG. 2F depicts a bottom view of the exemplary energy storage module relating to some embodiments.

FIG. 2F depicts a bottom view of the exemplary energy storage module 110 relating to some embodiments. In some embodiments, the energy storage module 110 comprises two mounting holes 126, as shown, one disposed on a first side of the bottom surface of the housing 112 and another disposed on a second side of the bottom surface of the housing 112. In some embodiments, the mounting holes 126 may be used to secure the energy storage module 110 to a surface, such as, for example, an inner surface of the battery compartment 102. In some embodiments, the energy storage module 110 may be mounted in a sideways orientation by securing the energy storage module 110 to a vertical surface via the one or more mounting holes 126 or another mounting structure. It should be understood, however, that other types of mounting means and arrangements are also contemplated. Further, in some embodiments, no mounting holes 126 are present.

Two-Post Ultracapacitor Module

In some embodiments, the energy storage module 110 comprises a two-post electrical connection. In some such embodiments, the two-post electrical connection may be used to interface the energy storage module 110 with an existing battery wiring harness that is adapted to interface with the two terminals of a battery.

Figure 3A:
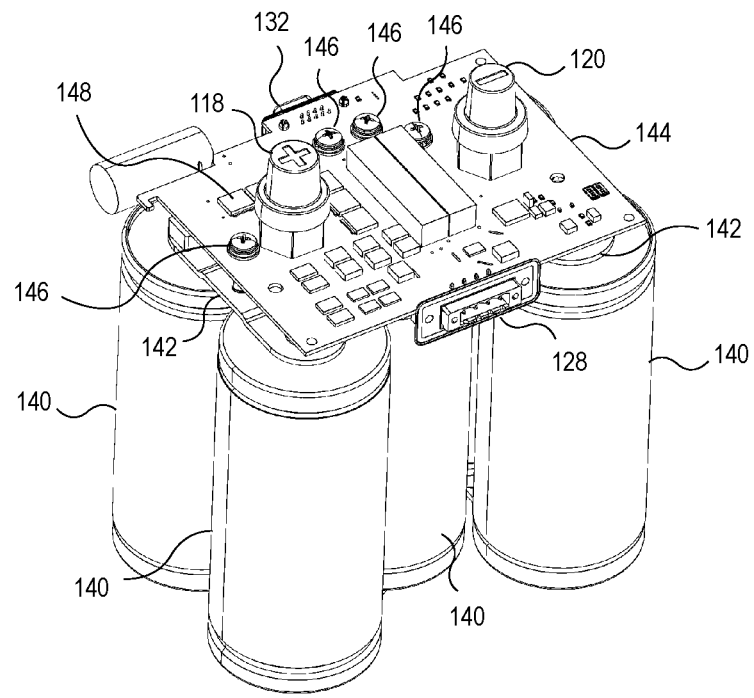
FIG. 3A depicts an internal isometric view of the exemplary energy storage module relating to some embodiments.

FIG. 3A depicts an internal isometric view of the exemplary energy storage module 110 relating to some embodiments. In some embodiments, the energy storage module 110 comprises one or more ultracapacitors 140, as shown, configured to be placed within the housing 112. In some embodiments, for example, five ultracapacitors 140 may be disposed within the housing 112, as shown. In some embodiments, the ultracapacitors 140 may be electrically connected in series using one or more bus bars 142, as shown. In some such embodiments, the bus bars 142 may comprise an electrically conductive Aluminum material. In some embodiments, the bus bar 142 is electrically connected and physically secured to terminals of the respective ultracapacitors 140.

In some embodiments, the ultracapacitors 140 may be electrically connected in series, as shown, by connecting the negative terminal of a first ultracapacitor to the positive terminal of a second ultracapacitor using a first bus bar and connecting the negative terminal of the second ultracapacitor to a positive terminal of a third ultracapacitor using a second bus bar and so on until a series of ultracapacitors is created. Additionally, embodiments are contemplated in which parallel arrangements of ultracapacitors are included. Further, in some embodiments, a combination of parallel and series electrical connections are contemplated. For example, two or more sets of serially connected ultracapacitors may be wired in parallel.

In some embodiments, a circuit board 144 may be included within the energy storage module 110. In some such embodiments, the circuit board 144 may be disposed on top of the one or more ultracapacitors 140 and the bus bars 142, as shown. In some embodiments, at least a portion of the circuit board 144 is electrically connected to the one or more ultracapacitors 140 via the bus bar 142. In some embodiments, the bus bars 142 provide both of an electrical connection and structural support within the energy storage module 110. For example, in some embodiments, the one or more ultracapacitors 140 are held in place via connection to the bus bars 142.

In some embodiments, the bus bars 142 may be electrically connected to the terminals of the ultracapacitors 140 and the circuit board 144 via laser welding. In some embodiments, the use of laser welding reduces an Equivalent Series Resistance (ESR) associated with the electrical connection. In some embodiments, the circuit board 144 may be secured in place using one or more bolts 146, as shown. In some embodiments, the bolts 146 secure the circuit board 144 to one or more of the bus bars 142. Alternatively, or additionally, in some embodiments, the circuit board 144 may be secured to an internal portion of the housing 112. In some embodiments, the energy storage module 110 comprises a plurality of electronic components 148 disposed on the circuit board 144. In some embodiments, the circuit board 144 is a Printed Circuit Board (PCB) comprising a Silicon-based semiconductor material.

In some embodiments, the electronic components 148 disposed on the circuit board 144 comprise any combination of resistors, thermistors, transistors, capacitors, transducers, sensors, and other suitable electronics not explicitly described herein. In some embodiments, at least a portion of the plurality of electronic components 148 may be operable to passively limit a charge current of the energy storage module 110, as will be described in further detail below.

In some embodiments, the electrical terminals of the energy storage module 110 may be disposed on the circuit board 144, as shown. In some embodiments, each of the positive terminal 118 and the negative terminal 120 are connected to the circuit board 144 but extrude vertically through the housing 112, as shown in FIG. 2A. In some embodiments, the electrical terminals may be electrically connected to the circuit board 144. Alternatively, or additionally, in some embodiments, the electrical terminals may interface directly with the bus bars 142 or the ultracapacitors 140. Accordingly, the electrical terminals are able to provide an electrical charge and discharge path for the one or more ultracapacitors 140. In some embodiments, each of the auxiliary charging port 128 and the auxiliary connector port 132 may be disposed on the circuit board 144, as shown. Accordingly, the auxiliary charging port 128 and the auxiliary connector port 132 may be operable to transfer one or more signals associated with the energy storage module 110. For example, in some embodiments, a signal indicative of the electrical charge status of one or more of the ultracapacitors 140 may be communicated via either or both of the auxiliary charging port 128 and the auxiliary connector port 132.

Figure 3B:
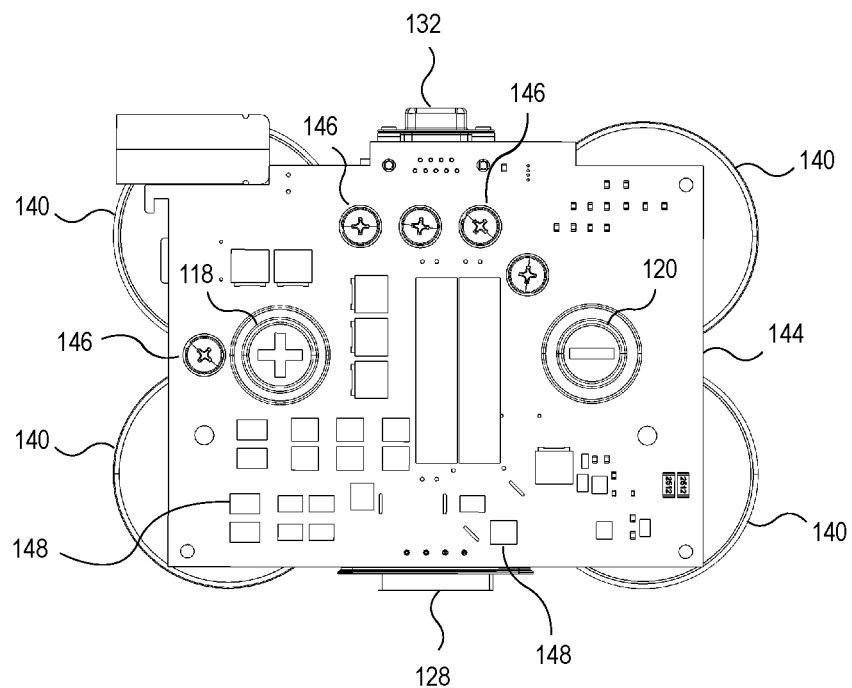
FIG. 3B depicts an internal top view of the exemplary energy storage module relating to some embodiments.

FIG. 3B depicts an internal top view of the exemplary energy storage module 110 relating to some embodiments. In some embodiments, the circuit board 144 may be positioned above the one or more ultracapacitors 140, as shown, secured by one or more bolts 146. In some embodiments, the circuit board 144 may be supported by the bus bars 142.

In some embodiments, the one or more ultracapacitors 140 and the circuit board 144 may be removably placed within the housing 112 such that they may be selectably replaced. For example, in some embodiments, parameters of each individual ultracapacitor 140 may be monitored such that the ultracapacitors 140 may be replaced as needed.

Figure 3C:
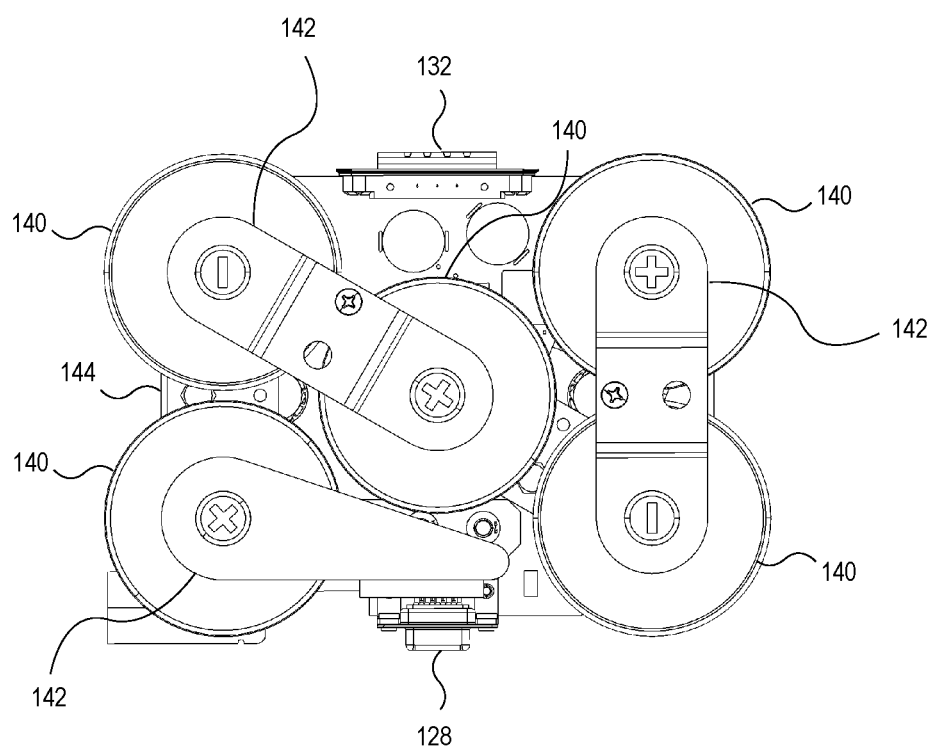
FIG. 3C depicts an internal bottom view of the exemplary energy storage module relating to some embodiments.

FIG. 3C depicts an internal bottom view of the exemplary energy storage module 110 relating to some embodiments. As shown, in some embodiments, the energy storage module 110 comprises five ultracapacitors 140 with bus bars 142 disposed above and below the ultracapacitors 140. Accordingly, in some embodiments, the bus bars 142 provide an electrical connection and structural support within the energy storage module 110 by supporting the one or more ultracapacitors 140 from below, as shown.

Passive Electronics

Figure 4:
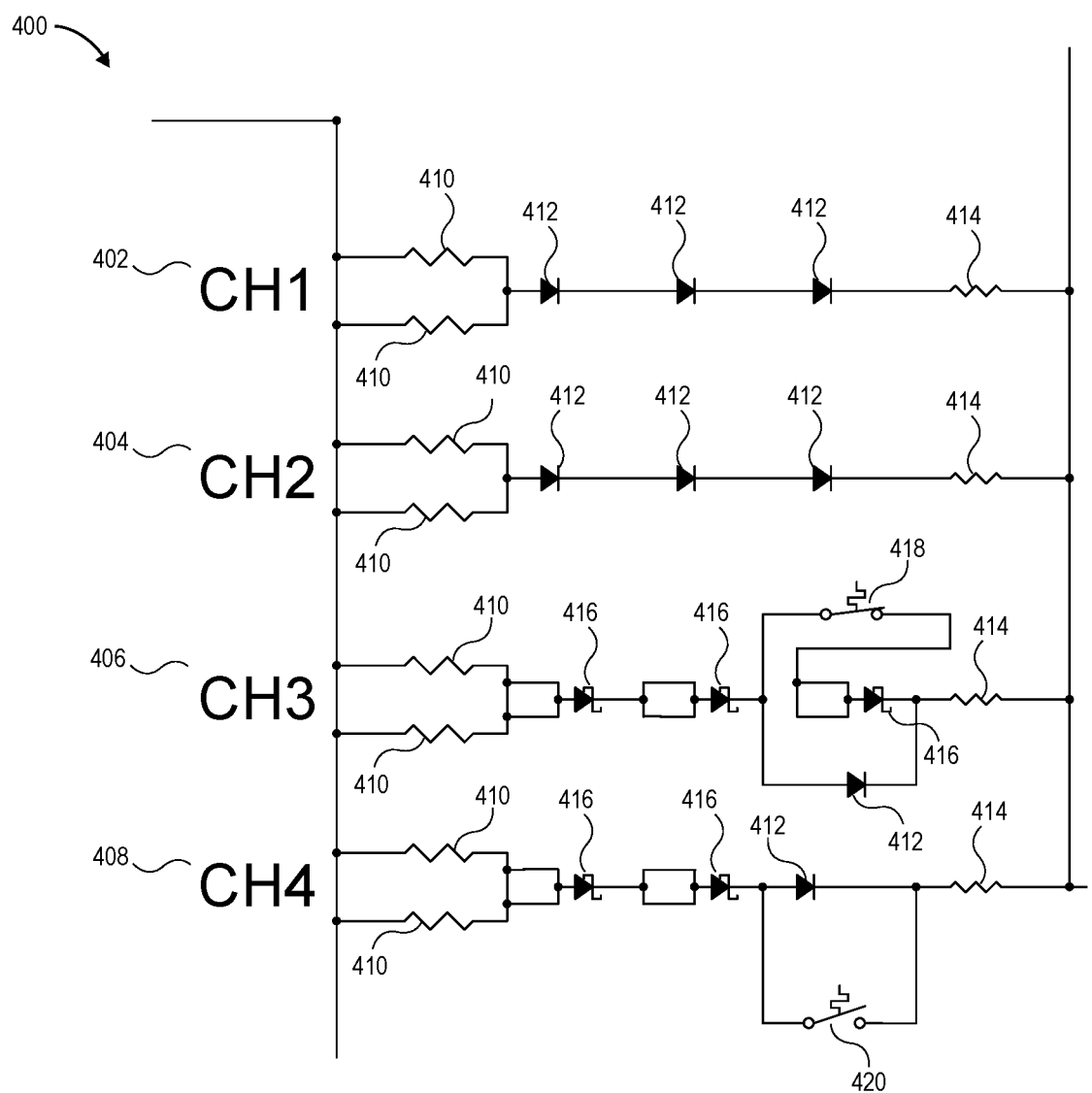
FIG. 4 depicts an exemplary electrical diagram of an electrical circuit relating to some embodiments.

FIG. 4 depicts an exemplary electrical diagram of an electrical circuit 400 relating to some embodiments. In some embodiments, the electrical circuit 400 represents a portion of the electronic components 148 disposed on the circuit board 144. In some embodiments, the electrical circuit 400 may comprise a charge circuit of the energy storage module 110. Accordingly, in some such embodiments, the electrical circuit 400 may be used to passively limit a charge current of the energy storage module 110.

In some embodiments, the electrical circuit 400 comprises a plurality of parallel electrical channels. For example, in some embodiments, a first channel 402, a second channel 404, a third channel 406, and a fourth channel 408 may be included, as shown. However, it should be understood that, in some embodiments, more or fewer channels may be included. In some embodiments, each of the electrical channels comprises one or more Positive Temperature Coefficient (PTC) thermistors 410. In some embodiments, two PTC thermistors 410 may be arranged in parallel for each channel, as shown. In some embodiments, the PTC thermistors 410 may be used to passively limit the charge current based on an internal temperature of the energy storage module 110. For example, in some embodiments, the electrical resistance of the PTC thermistors 410 increases with an increase in temperature. Accordingly, the electrical resistance will automatically be increased to limit the current in high temperature operating environments. Further, if a high current generates heat within the energy storage module 110 the current will automatically be reduced by the PTC thermistors 410.

In some embodiments, the passive limiting of the charge current is provided naturally by one or more materials within the PTC thermistors 410 for which the electrical resistance is sensitive to temperature changes. For example, any combination of silicon or polycrystalline materials, such as polycrystalline ceramics, may be included within the PTC thermistors 410. Additionally, embodiments are contemplated in which any suitable material that provides the temperature-sensitive electrical resistance may be included within the PTC thermistors 410 to passively limit the current based on temperature.

In some embodiments, the channels of PTC thermistors 410 provide passive thermal regulation by increasing the voltage of the energy storage module 110 at low temperatures and reducing the voltage of the energy storage module 110 at high temperatures. In some embodiments, the plurality of channels further distributes the electrical current between separate channels to provide charge path diversity that absorbs transient energy spikes thereby preventing damage to the energy storage module 110 and to other devices electrically connected to the energy storage module 110. Transient energy spikes may be caused, for example, by switching an electrical device coupled to the energy storage module 110. For example, a charge current may be passively distributed as one PTC thermistor 410 becomes hot from a large amount of current the electrical resistance of the PTC thermistor 410 will naturally increase such that current will be routed to a cooler lower resistance PTC thermistor 410 of a separate channel. In some embodiments, the channels of PTC thermistors 410 further limit the amount of charge that can be input into the energy storage module 110 over time to prevent issues associated with charging too quickly such as damage caused by a large charge transfer over a short period of time. In some embodiments, the charge path diversity provided by the channels of PTC thermistors 410 allows the energy storage module 110 to emulate the behavior of a lead acid battery by acting as a current sink to absorb transient energy spikes associated, for example, with a back-electromagnetic field (EMF).

In some embodiments, the electrical circuit 400 further comprises one or more rectifiers 412, which may be disposed on series along one or more of the channels, as shown. In some embodiments, the rectifiers 412 convert alternating current to direct current to control the current flow through one or more of the channels. In some embodiments, a series of rectifiers 412 may be disposed in the current path for the first channel 402 and the second channel 404, as shown. In some embodiments, one or more resistors 414 may also be included to resist current within various points of the electrical circuit 400. For example, in some embodiments, a resistor 414 may be included at the end of each channel, as shown. In some embodiments, the one or more resistors 414 protect the components of the electrical circuit 400 from voltage spikes by providing a voltage drop.

In some embodiments, one or more Schottky diodes 416 may be included within the electrical circuit 400. In some such embodiments, the Schottky diodes 416 may be used to provide higher switching speeds between the channels thereby increasing the efficiency of the electrical circuit 400. In some embodiments, one or more thermostats may be included within the electrical circuit 400 for opening and closing electrical paths based on a measured temperature. For example, in some embodiments, each thermostat may be coupled with a temperature sensor to measure an ambient or internal temperature of the energy storage module 110. In some embodiments, a normally closed thermostat 418 may be included within the third channel 406 and a normally open thermostat 420 may be included within the fourth channel 408, as shown. Alternatively, or additionally, in some embodiments, thermostats may be included elsewhere in the circuit. In some embodiments, the thermostats may be configured to open and close based on a predefined threshold temperature sensed by one or more temperature sensors. In some embodiments, the normally open thermostat 420 may be disposed in the fourth channel 408, as shown, in parallel with one of the rectifiers 412.

In some embodiments, the multiple channels of the electrical circuit 400 provide charge current path diversity to absorb transient voltage spikes, which may occur during a starting phase of a generator or other external charging device. Further, in some embodiments, the one or more ultracapacitors 140 may be separated from the charge circuit by one or more isolation diodes. In some such embodiments, the isolation diodes protect the ultracapacitors from collapsing magnetic fields associated with a starting operation. The starting operation may also be associated with noise injected into the ground bus of the electronics for which the isolation diodes provide further protection. Additionally, in some embodiments, one or more signal filters may be incorporated into the circuit 400 for filtering noise and unwanted current out of the charge circuit.

External Devices

Figure 5:
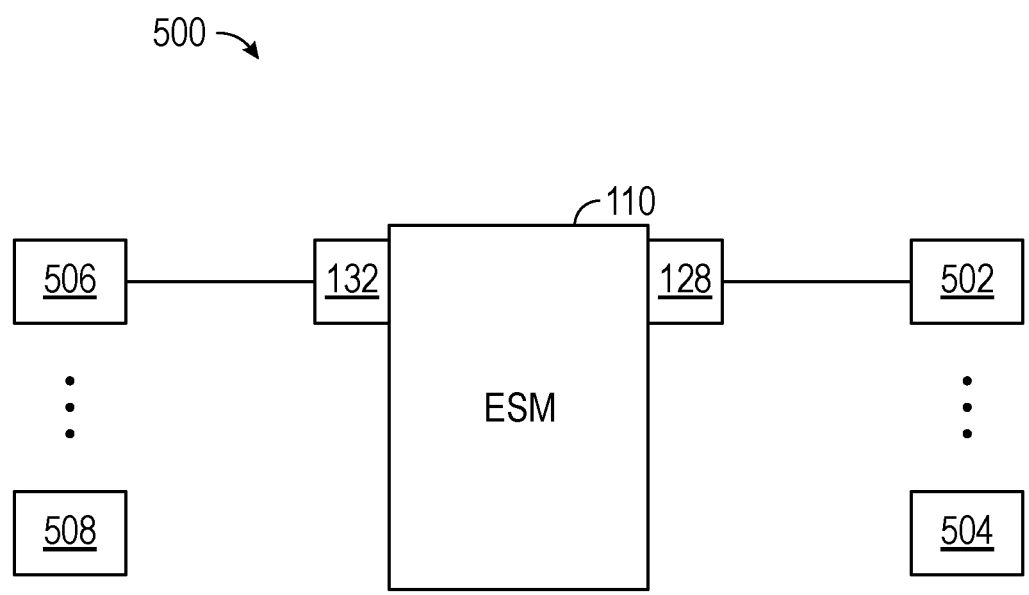
FIG. 5 depicts an exemplary diagram of a system relating to some embodiments.

FIG. 5 depicts an exemplary diagram of a system 500 relating to some embodiments. In some embodiments, the system 500 comprises the energy storage module 110, as shown, including the auxiliary charging port 128 and the auxiliary connector port 132. In some such embodiments, the auxiliary charging port 128 may be used to interface the energy storage module 110 with one or more external charge sources. For example, in some embodiments, an external solar panel 502 may interface with the energy storage module 110 by plugging into the auxiliary charging port 128, as shown. Accordingly, the ultracapacitors 140 may receive power from the external solar panel 502 via the auxiliary charging port 128. In some embodiments, one or more other external charging devices 504 may alternatively, or additionally, be connected to the auxiliary charging port 128 for charging the one or more ultracapacitors 140 of the energy storage module 110. For example, in some embodiments, a plurality of external charging devices, such as a plurality of solar panels or any combination of solar panels and other external charging devices, may be connected to the auxiliary charging port 128 in series or in parallel such that the ultracapacitors 140 receive power from multiple charging devices simultaneously. Alternatively, in some embodiments, the auxiliary charging port 128 may only interface with one external charging device at a time.

In some embodiments, the passive electronics of the energy storage module 110 allow virtually any type of solar panel or other external charging device to be integrated into the charging circuit without active current regulation. For example, the charging circuit may include one or more passive electronic components configured to short out the charge current from the external solar panel 502 when a threshold charge has been reached. In some such embodiments, the connection to the external solar panel 502 may be coupled to a dry electrical contact for shorting the charge input to ground when the energy storage module 110 is charged to full capacity. Accordingly, solar panels and external charging devices may safely provide any amount of charge without relying on an actively controlled charge circuit. In some embodiments, the external solar panel 502 may be a constant current device such that the same amount of current is supplied regardless of whether the solar panel is shorted to ground or providing energy. Further, the temperature-based passive electronics described above, such as the PTC thermistors 410 prevent large voltages and charge currents from damaging the ultracapacitors 140 and other electronic components by passively regulating the current based on an internal temperature of the energy storage module 110. As such, active electrical components, such as in-line current regulators, that consume additional energy, generate heat, and require expensive parts may be eliminated from the charge path of the energy storage module 110.

In some embodiments, the auxiliary connector port 132 may be configured to interface with one or more auxiliary devices such as a Bluetooth module 506, and/or one or more other auxiliary devices 508. In some embodiments, the Bluetooth module 506 may be used to wirelessly connect the one or more other auxiliary devices 508 to the energy storage module 110. In some embodiments, the one or more other auxiliary devices 508 may include any of an external controller, an external storage, and external analysis and diagnostics device.

Figure 6A:
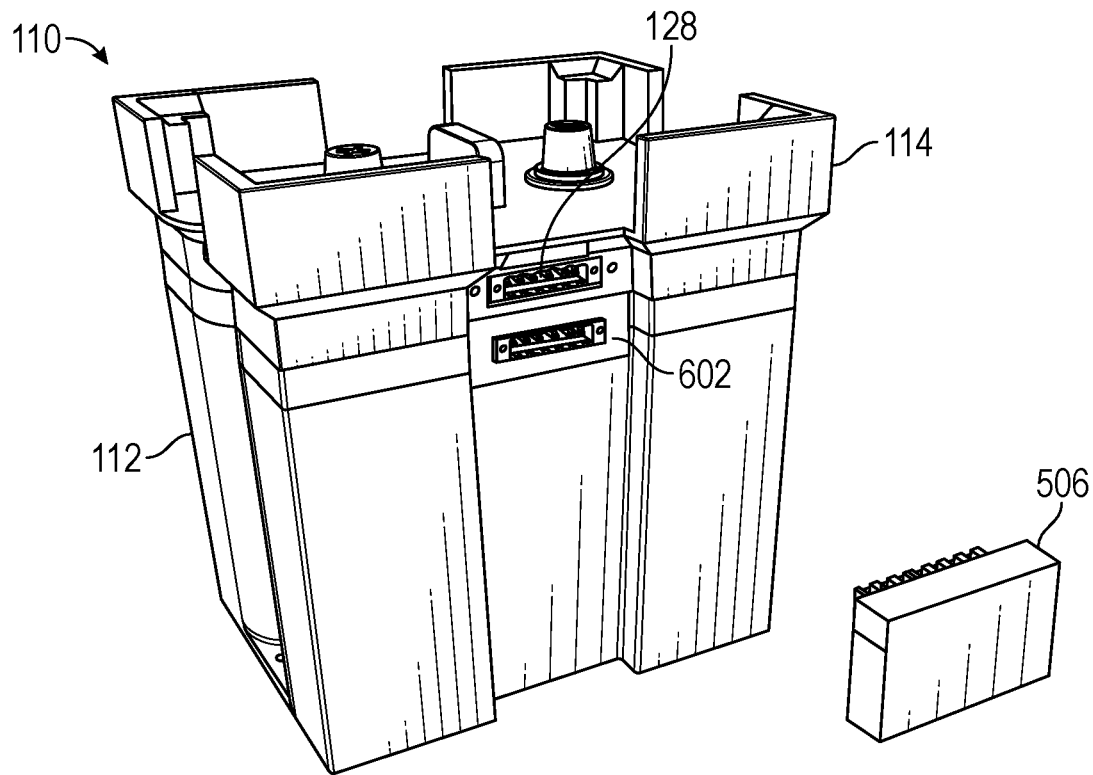
FIG. 6A depicts an exploded view of an exemplary submodule integration of the energy storage module relating to some embodiments.

FIG. 6A depicts an exploded view of an exemplary submodule integration of the energy storage module 110 relating to some embodiments. In some embodiments, the energy storage module 110 may further comprise a second auxiliary connector port 602 for receiving the Bluetooth module 506, as shown. In some embodiments, the Bluetooth module 506 may be secured to the housing 112 using one or more screws or other fastener devices. Accordingly, in some such embodiments, one or more mounting holes may be included within the housing adjacent to the second auxiliary connector port 602 for receiving the respective fastener devices.

Figure 6B:
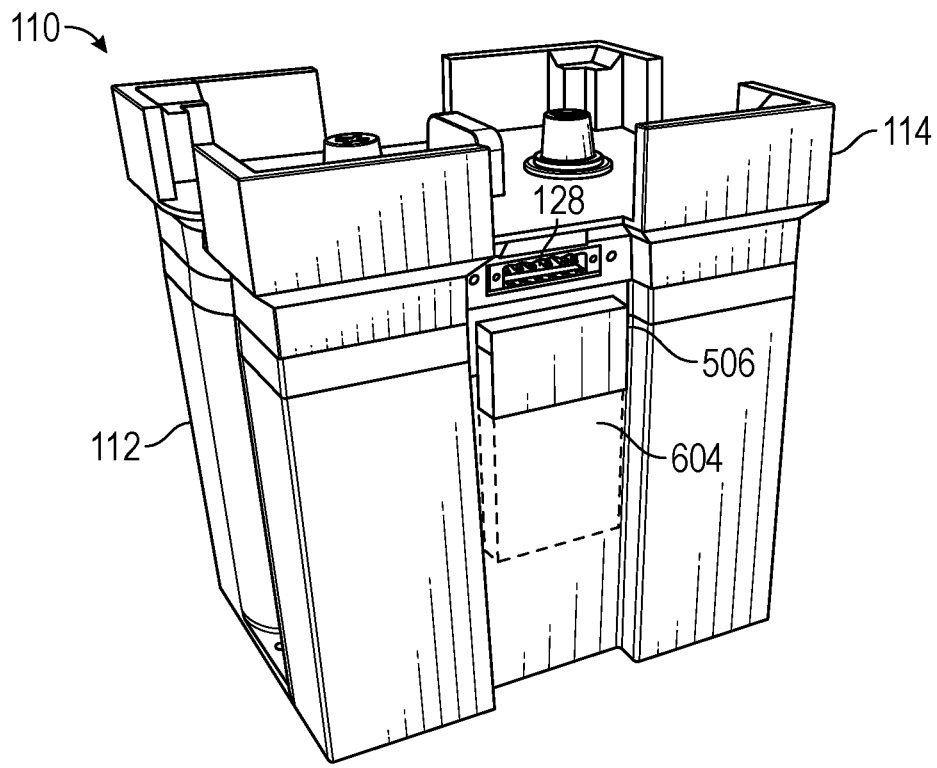
FIG. 6B depicts an exemplary submodule integration of the energy storage module relating to some embodiments.

FIG. 6B depicts an exemplary submodule integration of the energy storage module 110 relating to some embodiments. In some embodiments, the Bluetooth module 506 may be connected to the second auxiliary connector port 602 and placed within the cutaway portion 116 of the energy storage module 110, as shown. Accordingly, the cutaway portion 116 provides an opening such that the Bluetooth module 506 or another device may be connected to the energy storage module 110 without extruding past the profile of the housing 112, thus, increasing the mounting options of the energy storage module 110 and preventing damage to the connected devices.

In some embodiments, the Bluetooth module 506 is configured to further interface with an additional module 604, as shown. In some such embodiments, the additional module 604 may comprise a controller and/or data storage device. For example, in some embodiments, the additional module 604 may comprise a data analytics module mounted beneath the Bluetooth module 506 for monitoring data received from the energy storage module 110. For example, the data analytics module may monitor parameters of the energy storage module 110 such as remaining charge capacity, charge current, temperature, as well as individual ultracapacitor-specific parameters, such as the voltage of each ultracapacitor 140. In some embodiments, the equivalent series resistance may be monitored for each ultracapacitor 140 may be used to monitor a lifetime of the individual ultracapacitors 140.

In some embodiments, the Bluetooth module 506 may be configured to transmit a lifetime notification indicating an estimated lifetime of the energy storage module 110 or of each individual ultracapacitor 140. For example, in some embodiments, a notification may be transmitted in response to determining that one of the ultracapacitors 140 has exceeded (or is about to exceed) its useful lifetime based on one or more monitored parameters, the notification requesting to replace the ultracapacitor within the energy storage module 110. In some embodiments, the electrical parameters of the individual ultracapacitors 140 may be compared to determine, for example, if the voltage of one ultracapacitor is significantly lower than the other ultracapacitors within the energy storage module 110. If the voltage of a first ultracapacitor drops below a predetermine threshold range below the other ultracapacitors the first ultracapacitor may be deemed faulty and an alarm may be triggered to notify one or more operators that the first ultracapacitor should be repaired or replaced.

Figure 7:
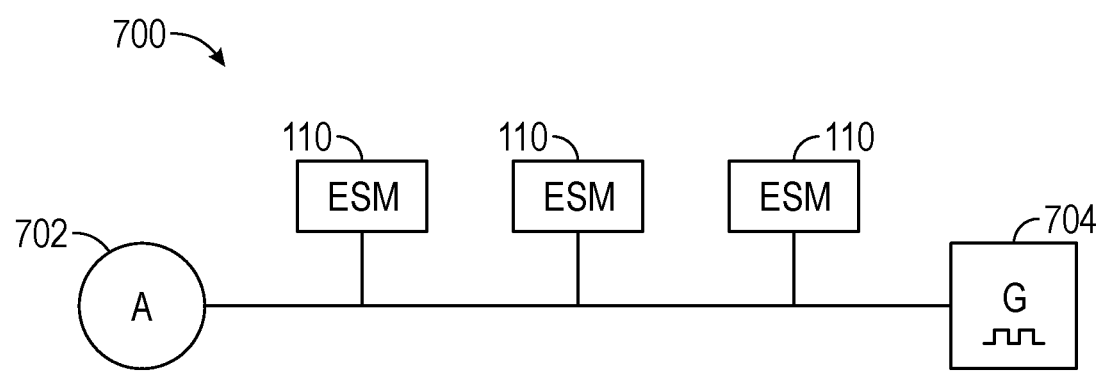
FIG. 7 depicts a diagram of an exemplary system relating to some embodiments.

FIG. 7 depicts a diagram of an exemplary system 700 relating to some embodiments. In some such embodiments, the system 700 comprises one or more energy storage modules 110 interfacing with an alternator 702 and a generator 704. In some embodiments, the system 700 may comprise a generator system for a telecommunications base station. Further, embodiments are contemplated in which the system 700 may be integrated into an automobile system or other suitable generator system. For example, one or more energy storage modules 110 may be included within an automobile to replace one or more vehicle batteries. Further still, embodiments are contemplated for use in other automotive applications such as within electric or hybrid vehicles. For example, in some embodiments, the energy storage modules 110, as described herein may be a primary or secondary power source for an electric vehicle.

In some embodiments, the energy storage modules 110 may be electrically connected to the alternator 702 via the electrical terminals of the energy storage modules 110. Accordingly, the alternator 702 may be used as a power source to charge the ultracapacitors 140 within each respective energy storage module 110. In some embodiments, in which a plurality of energy storage modules 110 are installed, the energy storage modules 110 may be electrically connected in series or in parallel depending on the specific application parameters of the system 700 such as the desired output voltage and capacity. For example, if a greater voltage is required, the energy storage modules 110 may be installed in series to increase the output voltage. Alternatively, if an increased runtime is desired, the energy storage modules 110 may be installed in parallel to increase the capacity while maintaining voltage. Further, embodiments are contemplated in which batteries or other storage devices are also included along with the one or more energy storage modules 110. For example, in some embodiments, a battery may be wired in series with a plurality of energy storage modules 110.

In some embodiments, the energy storage modules 110 are electrically connected to the generator 704 to provide electrical energy to the generator 704. For example, in some embodiments, electrical energy stored in the energy storage modules 110 is used to power a start-up procedure of the generator 704. Additionally, embodiments are contemplated in which excess power from the generator 704 may be used to back charge the ultracapacitors 140 of the energy storage modules 110.

In some embodiments, the energy storage modules 110, unlike typical capacitor-based storage modules, may be safely installed within the system 700 without pre-charging the energy storage modules 110. For example, an energy storage module 110 may be electrically connected between the alternator 702 and the generator 704 at zero volts. Here, the energy storage module 110 can be jumpstarted such that the alternator 702 will immediately begin charging the energy storage module 110 via the charge circuit, such as, the electrical circuit 400 described above. In some embodiments, the passive electronics of the energy storage module 110 are able to absorb transient charge currents from the alternator 702. Here, the reaction time of the PTC thermistors 410 allows for the current to be passively limited during transient voltage spikes. In some embodiments, the current path diversity provided by the plurality of channels in the electrical circuit 400 further increases the capability of the energy storage module 110 to absorb transient voltage spikes without damaging the components of the energy storage module 110 or other devices in the system 700.

Analytics

Figure 8:
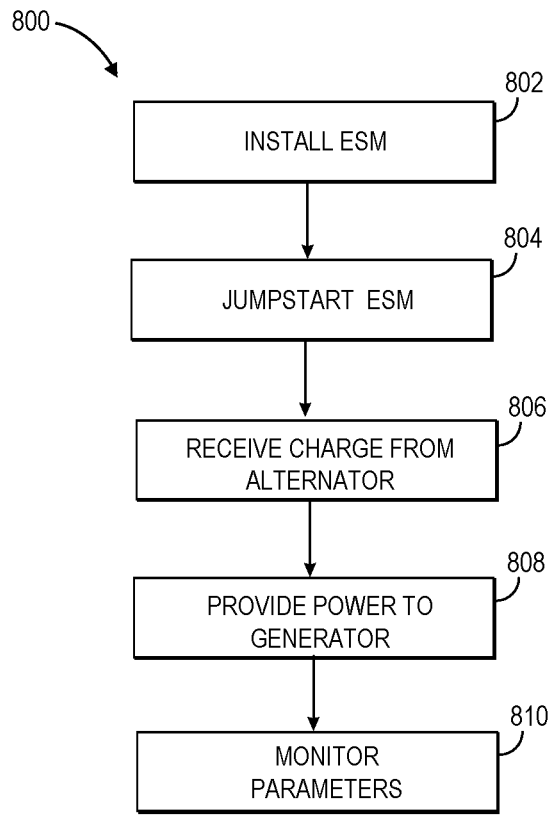
FIG. 8 depicts a flow diagram of an exemplary method relating to some embodiments.

FIG. 8 depicts a flow diagram of an exemplary method 800 relating to some embodiments. In some embodiments, the method 800 may be performed at least partially by an operator and at least partially by the energy storage module 110 itself. At step 802, the energy storage module 110 is installed. In some embodiments, the energy storage module 110 may be installed within the battery compartment 102, as described above with respect to FIG. 1. Further, in some embodiments, the energy storage module 110 may be installed within the system 700, as described above with respect to FIG. 7.

At step 804, the energy storage module 110 may be jumpstarted, if necessary. For example, in some embodiments, the energy storage module 110 may be charged prior to installation such that jump starting may not be necessary. Alternatively, in some embodiments, if the energy storage module 110 is not already charged, the energy storage module 110 may be jumpstarted using an external power source after installation. For example, cables may be attached to each of the positive terminal 118 and the negative terminal 120 of the energy storage module 110 for supplying a voltage from an external power source to jumpstart the energy storage module 110.

At step 806, the energy storage module 110 receives charge from the alternator 702. In some embodiments, the energy storage module 110 may also be at least partially charged by one or more other power sources such as the external solar panel 502, as described above. Alternatively, in some embodiments, the energy storage module 110 may be pre-charged prior to installation. In some embodiments, the passive electronics within the charge circuit of the energy storage module 110 allow the energy storage module 110 to be safely installed and electrically connected to the alternator 702 regardless of the charge state of the energy storage module 110. For example, the energy storage module 110 may installed at full charge, moderate charge, low charge, or no charge without damaging the energy storage module 110 or the alternator 702.

At step 808, the energy storage module 110 provides electrical power to the generator 704. In some embodiments, the energy storage module 110 may provide electrical power for starting the generator 704. For example, in some embodiments, the electrical power may be provided in response to initiation of a start-up procedure of the generator 704.

At step 810, one or more parameters of the energy storage module 110 and/or the ultracapacitors 140 may be monitored. For example, in some embodiments, a lifetime status of the energy storage module 110 may be monitored. In some such embodiments, the monitoring may be carried out externally. For example, in some embodiments, parameters relating to the energy storage module 110 or the individual ultracapacitors 140 may be transmitted to one or more external devices via the Bluetooth module 506 such that the external devices are able to determine when the entire energy storage module 110 or an individual ultracapacitor 140 should be replaced. In some embodiments, the monitored parameters include any of an equivalent series resistance (of the energy storage module 110 or of each ultracapacitor 140), a voltage (of the energy storage module 110 or of each ultracapacitor 140), or an internal temperature of the energy storage module 110. Further, in some embodiments, a total voltage of a plurality of energy storage modules 110 may be monitored.

In some embodiments, one or more indicators may be included on the housing 112 for indicating a state of the energy storage module 110. For example, an LED indicator may be disposed on a top surface of the housing such that it is visible to the operator to indicate whether the energy storage module 110 is operating properly. In some such embodiments, such a determination may depend on verifying whether the operating conditions of the energy storage module 110 are within a typical range. Alternatively, or additionally, in some embodiments, one or more remote indicators may be included to remotely notify operators of a status of the energy storage module 110. For example, in some embodiments, an operating status notification may be transmitted over a network via the Bluetooth module 506 or another connection of the energy storage module 110. Alternatively, or additionally, in some embodiments, an ethernet connection may be included such that the operating status notification or other communication signals may be transmitted via a wired connection.

In some embodiments, various other parameters of the energy storage module 110 may be monitored. For example, in some embodiments, a diagnostic health check may be carried out based on measured parameters and collected data for the energy storage module 110 to determine various types of faults or issues associated with the energy storage module 110. For example, in some embodiments, a processor, which may be a microprocessor or microcontroller disposed within the Bluetooth module 506 may perform an analysis to determine whether the energy storage module 110 is working properly based on one or more measured parameters. Further, in some embodiments, data relating to the energy storage module 110 may be collected over time to monitor and infer the performance of the energy storage module 110. In some embodiments, the analysis of the monitored parameters may be carried out externally to avoid interference with the passive internal electronics of the energy storage module 110. Accordingly, the internal electronics may remain separate and unaffected by the complexity of the active analysis which reduces analytical errors from inhibiting the operation of the energy storage module 110.

In some embodiments, the monitoring of the electrical parameters of the energy storage module 110 provides an efficient and environmentally friendly replacement routine. For example, the energy storage modules 110 and even the individual ultracapacitors 140 may be replaced as needed based on the monitored parameters as opposed to the typical method of replacement on an hours of operation basis, which leads to potentially wasting parts that still have useful life. In some embodiments, a replacement notification alarm may be triggered based on an ESR of the overall energy storage module 110 or of the individual ultracapacitors 140 such that the components may be replaced when they reach the end of usability but before they stop working thereby reducing the unnecessary waste associated with prematurely replacing the energy storage modules 110.

In some embodiments, a connection state of the energy storage module 110 may be monitored such that it may be determined if the energy storage module 110 becomes disconnected or is tampered with. Further, in some embodiments, a remote kill switch may be incorporated into the energy storage module 110 such that the energy storage module 110 may be automatically or manually disabled in the event of theft. For example, in some embodiments, an operator may remotely activate the kill switch upon noticing that the energy storage module 110 has been stolen such that the energy storage module 110 is remotely disabled and cannot be used by a malicious user. Future theft attempts of the energy storage modules 110 are thereby disincentivized.

Additionally, or alternatively, in some embodiments, a key may be required to activate the energy storage module 110 after installation. In some such embodiments, the key may interface with the auxiliary charging port 128 or the auxiliary connector port 132 to thereby activate the energy storage module 110. Accordingly, a malicious user who steals only the energy storage module 110 will be unable to activate and use the energy storage module 110 without also obtaining the key. Additionally, embodiments are contemplated in which digital activation keys may be used that correspond to a unique identifier of the respective energy storage module 110. For example, a unique activation key may be generated corresponding to a unique serial number for a given energy storage module 110.

In some embodiments, the energy storage module 110 comprises one or more dry electrical contacts to provide electrical isolation within the energy storage module 110. For example, in some embodiments, a dry electrical contact may be disposed within the electrical circuit 400 of the energy storage module 110 to provide an electrically isolated charge path for the energy storage module 110. As such, in some embodiments, the energy storage module 110 may be charged while simultaneously providing electrical energy to the generator 704. Alternatively, in some embodiments, a dry electrical contact may be incorporated into either of the auxiliary charging port 128 or the auxiliary connector port 132 to provide electrical isolation for the connections.

In some embodiments, the dry electrical contact is operable to provide an indication of whether the energy storage module 110 is working properly. For example, in some embodiments, the dry electrical contact may be coupled to a charge signal path of the energy storage module 110 such that the dry electrical contact indicates the charge state of the energy storage module 110 without affecting the charge current. In some embodiments, an alarm or other notification may be triggered based on the charge state indicated by the dry electrical contact. Further, in some embodiments, the dry electrical contact provides an indication of the internal voltage of the energy storage module 110. In some such embodiments, the indication may comprise a binary result of either a full voltage or a non-full voltage. Accordingly, the dry electrical contact may be used to determine whether additional charge should be provided to the energy storage module 110.

In some embodiments, the energy storage module 110 may switch between two states of operation including a charging state and a maintaining state. The charging state refers to a state in which the energy storage module 110 is below full charge and is being charged. The maintaining state refers to a state in which the energy storage module 110 is at or near full charge and passively maintains an internal voltage based at least in part on an ambient or internal temperature. In some embodiments, a predetermined voltage set point for the energy storage module 110 to maintain may be defined. Here, the states may be switched based at least in part on the dry electrical contact.

Self-Voltage Preservation

Figure 9:
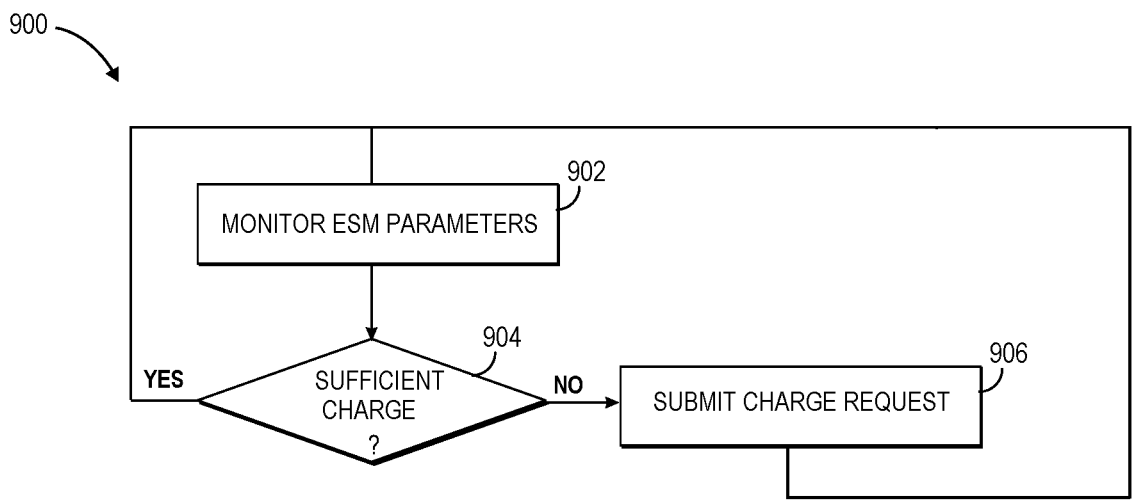
FIG. 9 depicts a flow diagram of an exemplary method for monitoring the energy storage module relating to some embodiments.

FIG. 9 depicts a flow diagram of an exemplary method 900 for monitoring the energy storage module 110 relating to some embodiments. In some embodiments, the method 900 may be carried out, at least partially, by an external controller. For example, in some embodiments, at least a portion of the operations of the method 900 may be performed by a processor or controller associated with the Bluetooth module 506. Alternatively, in some embodiments, a controller may be included on or within the energy storage module 110.

At step 902, one or more parameters associated with the energy storage module 110 are monitored. In some embodiments, the one or more parameters may include any combination of an ESR, a voltage output, a charge capacity, a temperature, as well as specific parameters relating to the individual ultracapacitors 140 disposed within the energy storage module 110.

At step 904, it is determined whether the energy storage module 110 contains a sufficient charge. In some embodiments, the determination may depend on the monitored parameters. For example, the sufficiency of the charge may be identified by monitoring a received charge capacity signal for the energy storage module 110. In some embodiments, if the charge capacity is sufficient, monitoring of the parameters may continue as usual. However, if the charge is determined not to be sufficient, a charge request may be submitted at step 906.

In some embodiments, the charge request may initiate charging from one or more power sources. For example, in some embodiments, a backup generator may be started responsive to the charge request to begin charging the energy storage module 110. Further, in some embodiments, the charge request may activate the one or more indicators 130 to notify an operator whether additional charging is required. Further still, in some embodiments, a notification may be transmitted remotely to a remote operator or a monitoring station indicating that the charge is low.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An energy storage module for replacing one or more batteries within a generator start energy system, the energy storage module comprising:
   a housing for installation within a compartment of the generator start energy system;
   one or more ultracapacitors disposed within the housing;
   a two-post electrical connection disposed on the housing, the two-post electrical connection comprising a positive terminal and a negative terminal,
   wherein each of the positive terminal and the negative terminal are electrically connected to the one or more ultracapacitors for charging and discharging the one or more ultracapacitors;
   an electrical circuit disposed within the housing, the electrical circuit interfacing with the one or more ultracapacitors; and
   two or more Positive Temperature Coefficient (PTC) thermistors disposed in parallel within the electrical circuit for passively limiting a charge current of the one or more ultracapacitors based on an internal temperature of the energy storage module and passively distributing the charge current within the electrical circuit.

2. The energy storage module of claim 1, further comprising:
   an auxiliary charging port for charging the one or more ultracapacitors via one or more external power sources, the auxiliary charging port comprising a dry contact for isolating the auxiliary charging port from the two-post electrical connection.

3. The energy storage module of claim 2, wherein the one or more external power sources comprises a solar panel, and wherein an output of the solar panel is electrically connected to the auxiliary charging port for supplying electrical energy to charge the one or more ultracapacitors.

4. The energy storage module of claim 3, wherein an input current of the auxiliary charging port is passively limited such that the input current is electrically shorted when the one or more ultracapacitors are fully charged.

5. The energy storage module of claim 1,
   wherein the electrical circuit comprises a plurality of current path channels for providing current path diversity within the electrical circuit,
   wherein a respective one of the two or more PTC thermistors is disposed within each current path channel of the plurality of current path channels.

6. The energy storage module of claim 1, further comprising:
   an auxiliary connector port configured to interface with a Bluetooth module; and
   a cutaway portion in the housing that provides space for the Bluetooth module.

7. The energy storage module of claim 6, wherein a signal indicative of one or more parameters of the energy storage module is transmitted through the auxiliary connector port to the Bluetooth module for analysis of the one or more parameters of the energy storage module.

8. An energy storage system for providing energy for one or more electrical devices, the energy storage system comprising:
- a plurality of energy storage modules disposed within a compartment associated with the one or more electrical devices, each energy storage module of the plurality of energy storage modules comprising:
  - a housing for installation within the compartment associated with the one or more electrical devices;
  - one or more ultracapacitors disposed within the housing;
  - a two-post electrical connection disposed on the housing, the two-post electrical connection comprising a positive terminal and a negative terminal,
  - wherein each of the positive terminal and the negative terminal are electrically connected to the one or more ultracapacitors for charging and discharging the one or more ultracapacitors;
  - an electrical circuit disposed within the housing, the electrical circuit interfacing with the one or more ultracapacitors; and
  - one or more Positive Temperature Coefficient (PTC) thermistors disposed within the electrical circuit for passively limiting a charge current of the one or more ultracapacitors based on an internal temperature of the respective energy storage module,
  - wherein the electrical circuit comprises a plurality of current path channels for providing current path diversity within the electrical circuit,
  - wherein a respective one of the one or more PTC thermistors is disposed within each current path channel of the plurality of current path channels.

9. The energy storage system of claim 8, further comprising one or more batteries disposed within the compartment associated with the one or more electrical devices.

10. The energy storage system of claim 9, wherein the plurality of energy storage modules and the one or more batteries are electrically connected in series.

11. The energy storage system of claim 9, wherein the plurality of energy storage modules and the one or more batteries are electrically connected in parallel.

12. The energy storage system of claim 8, further comprising a strap disposed around two or more energy storage modules of the plurality of energy storage modules for securing the two or more energy storage modules within the compartment associated with the one or more electrical devices.

13. The energy storage system of claim 8, wherein the one or more PTC thermistors provide additional energy when the internal temperature of the respective energy storage module is below a predefined threshold temperature.

14. The energy storage system of claim 8, wherein the one or more PTC thermistors provide reduced energy when the internal temperature of the respective energy storage module is above a predefined threshold temperature.

15. An energy storage module for replacing one or more batteries within a generator start energy system, the energy storage module comprising:
- a mountable housing for installation within a compartment of the generator start energy system, the mountable housing comprising a cutaway portion providing space around the mountable housing of the energy storage module;
- one or more ultracapacitors disposed within the mountable housing;
- a two-post electrical connection disposed on the mountable housing, the two-post electrical connection comprising a positive terminal and a negative terminal,
- wherein each of the positive terminal and the negative terminal are electrically connected to the one or more ultracapacitors for charging and discharging the one or more ultracapacitors;
- an electrical circuit disposed within the mountable housing, the electrical circuit interfacing with the one or more ultracapacitors; and
- an auxiliary charging port disposed on the mountable housing within the cutaway portion for charging the one or more ultracapacitors via one or more external power sources, the auxiliary charging port comprising a dry contact for isolating the auxiliary charging port from the two-post electrical connection.

16. The energy storage module of claim 15, further comprising:
- one or more Positive Temperature Coefficient (PTC) thermistors disposed within the electrical circuit for passively limiting a charge current of the one or more ultracapacitors based on an internal temperature of the energy storage module.

17. The energy storage module of claim 16, further comprising:
- an auxiliary connector port disposed on the mountable housing within the cutaway portion for interfacing the energy storage module with one or more external devices.

18. The energy storage module of claim 17, further comprising:
- a Bluetooth module disposed within the cutaway portion and connected to the auxiliary connector port, the Bluetooth module operable to wirelessly communicate with the one or more external devices.

19. The energy storage module of claim 18, wherein the Bluetooth module comprises a processor for actively monitoring the one or more ultracapacitors.

20. The energy storage module of claim 15, wherein the energy storage module is configured to be jumpstarted via the two-post electrical connection after installation within the compartment of the generator start energy system.

* * * * *